United States Patent
Pretli

(10) Patent No.: US 12,003,484 B2
(45) Date of Patent: Jun. 4, 2024

(54) SYSTEMS AND METHODS FOR PREVENTING DATA LEAKS OVER RTP OR SIP

(71) Applicant: Fortinet, Inc., Sunnyvale, CA (US)

(72) Inventor: Jochen Pretli, Frankfurt (DE)

(73) Assignee: Fortinet, Inc., Sunnyvale, CA (US)

( * ) Notice: Subject to any disclaimer, the term of this patent is extended or adjusted under 35 U.S.C. 154(b) by 134 days.

(21) Appl. No.: 17/859,162

(22) Filed: Jul. 7, 2022

(65) Prior Publication Data
US 2024/0015139 A1    Jan. 11, 2024

(51) Int. Cl.
*H04L 9/40* (2022.01)
*H04L 61/256* (2022.01)

(52) U.S. Cl.
CPC ...... *H04L 63/0245* (2013.01); *H04L 61/2564* (2013.01); *H04L 63/0421* (2013.01)

(58) Field of Classification Search
CPC ............ H04L 63/0245; H04L 63/0421; H04L 61/2564
See application file for complete search history.

(56) References Cited

U.S. PATENT DOCUMENTS

| | | | |
|---|---|---|---|
| 8,464,329 B2 * | 6/2013 | Fogel | H04L 65/1104 713/162 |
| 2007/0209067 A1 * | 9/2007 | Fogel | H04L 65/1104 726/11 |
| 2009/0119774 A1 * | 5/2009 | Moss | H04L 63/145 711/108 |
| 2014/0101751 A1 * | 4/2014 | Lee | H04L 43/028 726/13 |
| 2017/0201537 A1 * | 7/2017 | Caldwell | H04J 3/0667 |

* cited by examiner

*Primary Examiner* — Linglan Edwards
(74) *Attorney, Agent, or Firm* — Jaffery Watson Mendonsa & Hamilton LLP

(57) ABSTRACT

Systems, devices, and methods are discussed for avoiding data thefts in real-time transactions.

18 Claims, 7 Drawing Sheets

500

510

600

610

800

810

900

910

SYSTEMS AND METHODS FOR PREVENTING DATA LEAKS OVER RTP OR SIP

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2021, Fortinet, Inc.

FIELD

Embodiments discussed generally relate to guarding against data thefts in a network, and more particularly to systems and methods for avoiding data thefts in real-time transactions.

BACKGROUND

In real-time transfer protocol (RTP) and session initiated transfer protocol (SIP) are used for transferring real-time data such as, for example, audio data and video data. One problem with these protocols is the ability to insert data in the middle of a real-time data stream in an effort to smuggle data out from behind a network gateway disguised as real-time data. Such smuggling of data can result in considerable losses for a company.

Thus, there exists a need in the art for more advanced approaches, devices and systems for reducing the possibility of smuggling data as real-time data.

SUMMARY

Various embodiments provide systems and methods for avoiding data thefts in real-time transactions.

This summary provides only a general outline of some embodiments. Many other objects, features, advantages and other embodiments will become more fully apparent from the following detailed description, the appended claims and the accompanying drawings and figures.

BRIEF DESCRIPTION OF THE DRAWINGS

A further understanding of the various embodiments may be realized by reference to the figures which are described in remaining portions of the specification. In the figures, similar reference numerals are used throughout several drawings to refer to similar components. In some instances, a sub-label consisting of a lower-case letter is associated with a reference numeral to denote one of multiple similar components. When reference is made to a reference numeral without specification to an existing sub-label, it is intended to refer to all such multiple similar components.

DETAILED DESCRIPTION

Figure 1A:
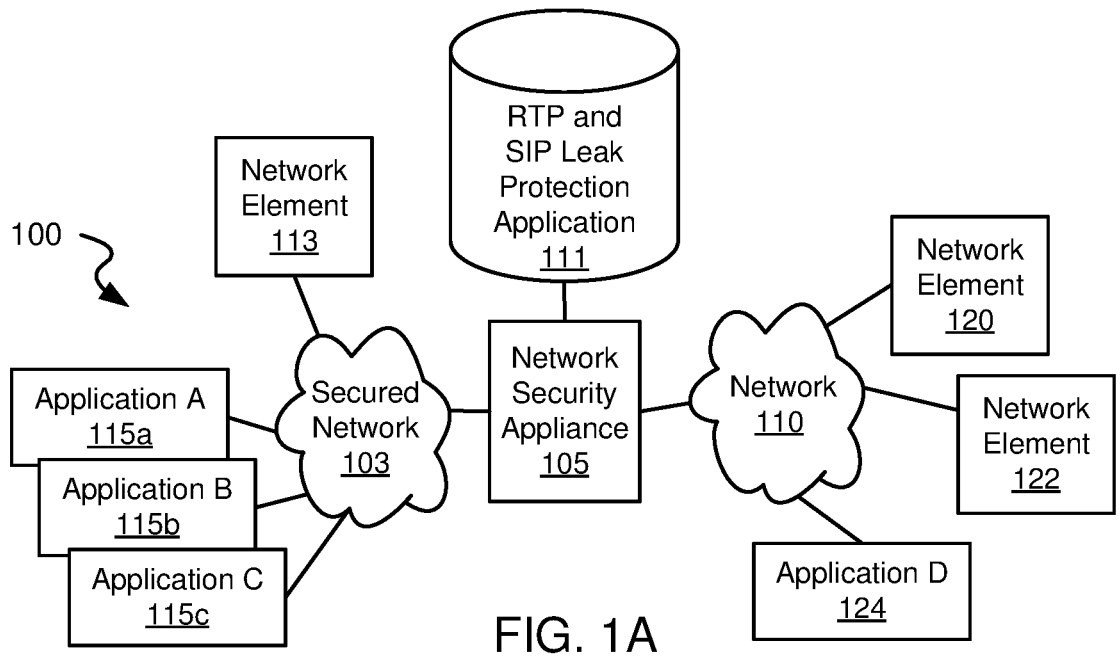
FIGS. 1A-1C illustrate a network architecture having a network security appliance executing an RTP and SIP leak protection application is shown in accordance with various embodiments.

Various embodiments provide systems and methods systems and methods for avoiding data thefts in real-time transactions.

Embodiments of the present disclosure include various processes, which will be described below. The processes may be performed by hardware components or may be embodied in machine-executable instructions, which may be used to cause a general-purpose or special-purpose processor programmed with the instructions to perform the steps. Alternatively, processes may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

In the following description, numerous specific details are set forth in order to provide a thorough understanding of embodiments of the present disclosure. It will be apparent to one skilled in the art that embodiments of the present disclosure may be practiced without some of these specific details.

Terminology

Brief definitions of terms used throughout this application are given below.

The terms "connected" or "coupled" and related terms, unless clearly stated to the contrary, are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

As used herein, a "network appliance", "network device", or "network element" generally refers to a device or appliance in virtual or physical form that is operable to perform one or more network or endpoint functions. In some cases, a network appliance may be a database, a network server, computer, mobile phone, or the like. Some network elements may be implemented as general-purpose computers or servers with appropriate software operable to perform the one or more network functions. Other network elements may also include custom hardware (e.g., one or more custom Application-Specific Integrated Circuits (ASICs)). Based upon the disclosure provided herein, one of ordinary skill in the art will recognize a variety of network appliances that may be used in relation to different embodiments. In some cases, a network appliance may be a "network security appliance", "network security device", or a "network security element" that may reside within the particular network that it is protecting or network security may be provided as a service with the network security device residing in the cloud. For example, while there are differences among network security device vendors, network security devices may be classified in three general performance categories, including entry-level, mid-range, and high-end network security devices. Each category may use different types and forms of central processing units (CPUs), network processors (NPs), and content processors (CPs). NPs may be used to accelerate traffic by offloading network traffic from the main processor. CPs may be used for security functions, such as flow-based inspection and encryption. Entry-level network security devices may include a CPU and no co-processors or a system-on-a-chip (SoC) processor that combines a CPU, a CP and an NP. Mid-range network security devices may include a multi-core CPU, a separate NP Application-Specific Integrated Circuits (ASIC), and a separate CP ASIC. At the high-end, network security devices may have multiple NPs and/or multiple CPs. A network security device is typically associated with a particular network (e.g., a private enterprise network) on behalf of which it provides the one or more security functions. Non-limiting examples of security functions include authentication, next-generation firewall protection, antivirus scanning, content filtering, data privacy protection, web filtering, network traffic inspection (e.g., secure sockets layer (SSL) or Transport Layer Security (TLS) inspection), intrusion prevention, intrusion detection, denial of service attack (DoS) detection and mitigation, encryption (e.g., Internet Protocol Secure (IPSec), TLS, SSL), application control, Voice over Internet Protocol (VoIP) support, Virtual Private Networking (VPN), data leak prevention (DLP), antispam, antispyware, logging, reputation-based protections, event correlation, network access control, vulnerability management, and the like. Such security functions may be deployed individually as part of a point solution or in various combinations in the form of a unified threat management (UTM) solution. Non-limiting examples of network security appliances/devices include network gateways, VPN appliances/gateways, UTM appliances (e.g., the FORTIGATE family of network security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), network access control appliances (e.g., FORTINAC family of network access control appliances), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances), and DoS attack detection appliances (e.g., the FORTIDDOS family of DoS attack detection and mitigation appliances).

The phrase "processing resource" is used in its broadest sense to mean one or more processors capable of executing instructions. Such processors may be distributed within a network environment or may be co-located within a single network appliance. Based upon the disclosure provided herein, one of ordinary skill in the art will recognize a variety of processing resources that may be used in relation to different embodiments.

Example embodiments will now be described more fully hereinafter with reference to the accompanying drawings, in which exemplary embodiments are shown. This disclosure may, however, be embodied in many different forms and should not be construed as limited to the embodiments set forth herein. It will be appreciated by those of ordinary skill in the art that the diagrams, schematics, illustrations, and the like represent conceptual views or processes illustrating systems and methods embodying various aspects of the present disclosure. The functions of the various elements shown in the figures may be provided through the use of dedicated hardware as well as hardware capable of executing associated software and their functions may be carried out through the operation of program logic, through dedicated logic, through the interaction of program control and dedicated logic.

Some embodiments provide methods that include: receiving, by a processing resource, a data transfer packet including a data payload; determining, but the processing resource, that the data transfer packet is a real-time data transfer packet; based at least in part on the data transfer packet being a real time data transfer packet, modifying, by the processing resource, any non-real-time data included in the data payload to yield a modified data payload; and forwarding, by the processing resource, the data transfer packet including the modified data payload. In some instances of the aforementioned embodiments, the real-time data transfer packet is a real-time transfer protocol packet. In other instances of the aforementioned embodiments, the real-time data transfer packet is session initiated transfer protocol packet.

In some instances of the aforementioned embodiments, the methods further include: scanning, by the processing resource, the payload for an expected data type pattern; identifying, by the processing resource, a portion of the payload as not matching the expected data type pattern; obscuring, by the processing resource, the identified portion of the payload to yield and obscure data set; and wherein the modified data payload includes the obscure data set in place of the identified portion of the payload. In some such instances, obscuring the identified portion includes replacing the identified portion with a random pattern. In other such instances, obscuring the identified portion includes replacing the identified portion with a fixed pattern.

In various instances of the aforementioned embodiments, the methods further include: providing, by the processing resource, the data payload to a conversion circuit, wherein the conversion circuit converts the data payload from a digital domain to an analog domain, and then from the analog domain to the digital domain to yield a domain transfer modified payload; receiving, by the processing resource, the domain transfer modified payload; and wherein the modified data payload includes the domain transfer modified payload in place of the data payload. In some such instances, the conversion of the data payload is done using an algorithm that is compatible with at least a portion of the data payload. In some cases where the portion of the data payload is a first portion of the data payload, the algorithm may be incompatible with a second portion of the data payload.

Other embodiments provide systems for reducing the possibility of data theft via a real-time transfer. Such systems include a processing resource and a non-transitory computer-readable medium. The non-transitory computer-readable medium is coupled to the processing resource, and has stored therein instructions that when executed by the processing resource cause the processing resource to: receive a data transfer packet including a data payload; determine that the data transfer packet is a real-time data transfer packet; based at least in part on the data transfer packet being a real time data transfer packet, modify any non-real-time data included in the data payload to yield a modified data payload; and forward the data transfer packet including the modified data payload.

Yet other embodiments provide non-transitory computer-readable storage media embodying a set of instructions, which when executed by a processing resource, causes the processing resource to: receive a data transfer packet including a data payload; determine that the data transfer packet is a real-time data transfer packet; based at least in part on the data transfer packet being a real time data transfer packet, modify any non-real-time data included in the data payload to yield a modified data payload; and forward the data transfer packet including the modified data payload.

Turning to FIG. 1A, a network architecture 100 having a network security appliance 105 executing an RTP and SIP leak protection application 111 is shown in accordance with various embodiments. Network security appliance 105 protects a secured network 103. Secured network 103 may be any type of network known in the art. Thus, secured network 103 may be, but is not limited to, a wireless network, a wired network or a combination thereof that can be implemented as one of the various types of networks, such as the Internet, an Intranet, a Local Area Network (LAN), a Wide Area Network (WAN), and the like.

Secured network 103 provides for internetwork communications between network element 113 and applications 115 (i.e., application A 115a, application B 115b, and application C 115c). Network security appliance 105 operates as a gateway between secured network 103 and outside networks (e.g., a network 110). Network 110 may be any type of network known in the art. Thus, network 110 may be, but is not limited to, a wireless network, a wired network or a combination thereof that can be implemented as one of the various types of networks, such as the Internet, an Intranet, a Local Area Network (LAN), a Wide Area Network (WAN), and the like. Network security appliance 105 provides for communications between network element 113 and network element 120, network element 122, and network element 124 via network 110.

Execution of RTP and SIP leak protection application 111 by network security appliance 105 causes any real-time traffic passing through network security appliance 105 toward network 110 to be modified to destroy any non-real-time data that is imbedded as if it is real-time data. In some embodiments, the data is modified by converting the transferred digital data to the analog domain, and then re-sampling the analog domain data to convert it back to the digital domain. Once converted back, the digital data is transferred out toward network 110 via by network security device 105.

Figure 1B:
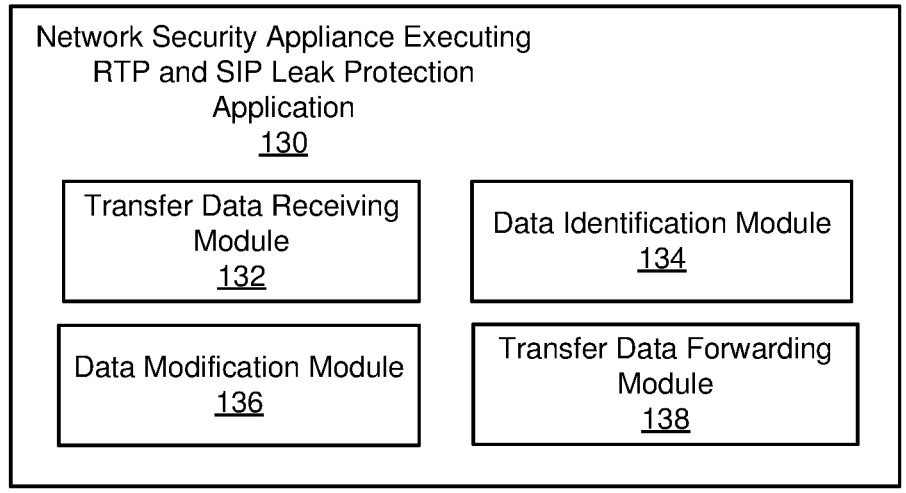

Turning to FIG. 1B, an embodiment implementation of a network security appliance executing RTP and SIP leak protection application 130 is shown in accordance with some embodiments. As shown, network security appliance executing RTP and SIP leak protection application 130 includes a transfer data receiving module 132, a data identification module 134, a data modification module 136, and a transfer data forwarding module 138.

Transfer data receiving module 132 is configured to receive data packets. Data identification module 134 is configured to identify the type of data purportedly being transferred as part of a received data packet. For example, data identification module 134 may be configured to determine whether the received data transfer packet has real-time data (e.g., is an RTP or SIP data transfer packet. In some cases, data identification module 134 further includes data scanning capability configured to determine whether the data in the received data transfer packet conforms to the expected data type. Data modification module 136 is configured to modify at least a portion of the data included in the received data packet to reduce the possibility of non-real time data being transferred out of the network masquerading as real-time data. Transfer data forwarding module 138 is configured to transfer the received data packet modified, where applicable, to a recipient or another process in a network security appliance.

Figure 1C:
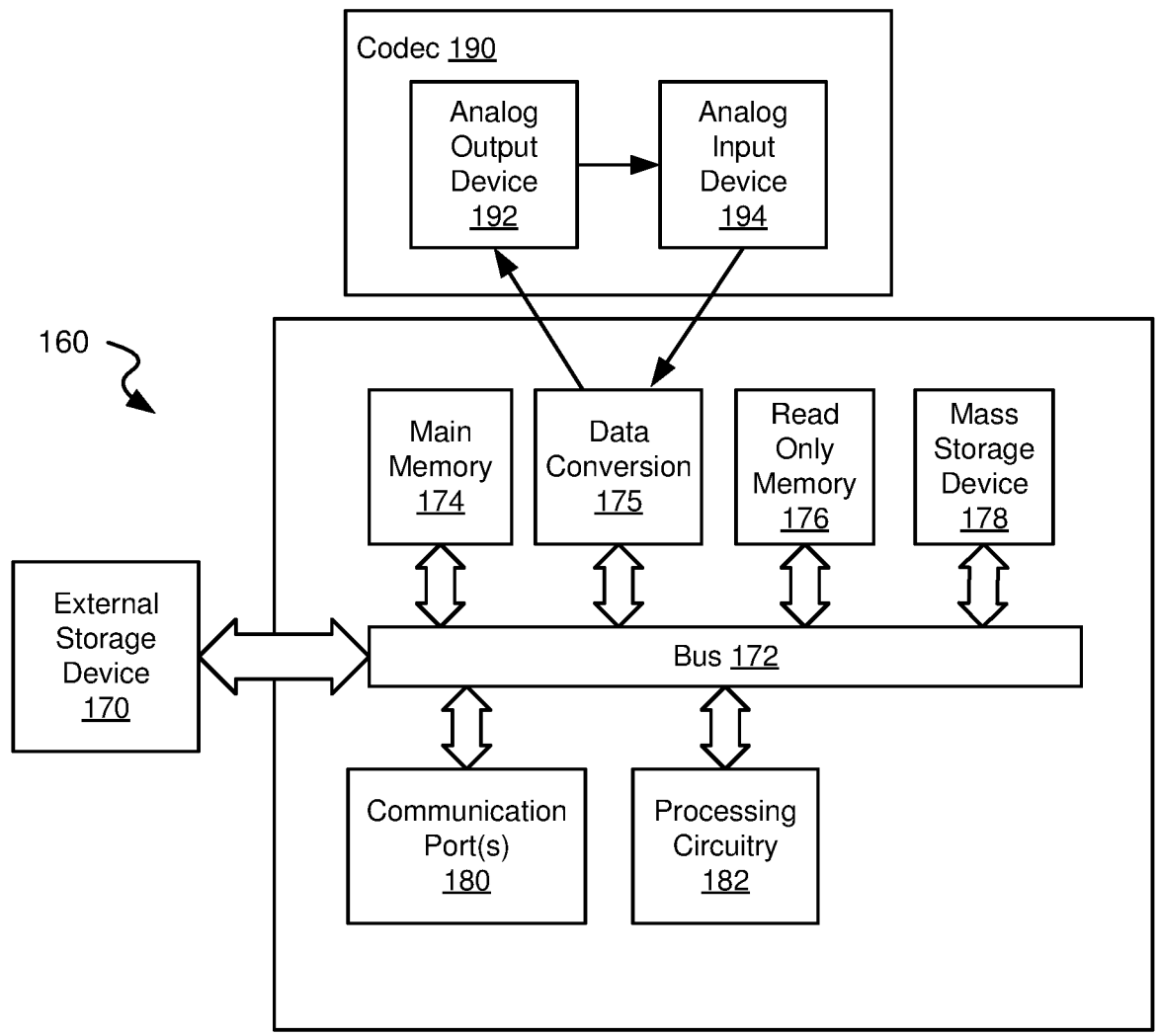

Turning to FIG. 1C, an example computer system 160 is shown in which or with which embodiments of the present disclosure may be utilized. As shown in FIG. 1C, computer system 160 includes an external storage device 170, a bus 172, a main memory 174, a read-only memory 176, a mass storage device 178, one or more communication ports 180, and one or more processing resources (e.g., processing circuitry 182), and a data conversion controller 175. In some cases, computer system 160 may be used to implement all or part of network security appliance 105.

Those skilled in the art will appreciate that computer system 160 may include more than one processing resource 182 and communication port 180. Non-limiting examples of processing resources include, but are not limited to, Intel Quad-Core, Intel i3, Intel i5, Intel i7, Apple M1, AMD Ryzen, or AMD® Opteron® or Athlon MP® processor(s), Motorola® lines of processors, FortiSOC™ system on chip processors or other future processors. Processors 182 may include various modules associated with embodiments of the present disclosure.

Communication port 180 can be any of an RS-232 port for use with a modem-based dialup connection, a 10/100 Ethernet port, a Gigabit, 10 Gigabit, 25G, 40G, and 100G port using copper or fiber, a serial port, a parallel port, or other existing or future ports. Communication port 180 may be chosen depending on a network, such as a Local Area Network (LAN), Wide Area Network (WAN), or any network to which the computer system connects.

Memory 174 can be Random Access Memory (RAM), or any other dynamic storage device commonly known in the art. Read only memory 176 can be any static storage device(s) e.g., but not limited to, a Programmable Read Only Memory (PROM) chips for storing static information e.g. start-up or BIOS instructions for the processing resource.

Mass storage 178 may be any current or future mass storage solution, which can be used to store information and/or instructions. Non-limiting examples of mass storage solutions include Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi Deskstar 7K1300), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 172 communicatively couples processing resource(s) with the other memory, storage and communication blocks. Bus 172 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processing resources to software system.

Optionally, operator and administrative interfaces, e.g., a display, keyboard, and a cursor control device, may also be coupled to bus 172 to support direct operator interaction with the computer system. Other operator and administrative interfaces can be provided through network connections connected through communication port 180. External storage device 170 can be any kind of external hard-drives, floppy drives, IOMEGA® Zip Drives, Compact Disc-Read Only Memory (CD-ROM), Compact Disc-Rewritable (CD-RW), Digital Video Disk-Read Only Memory (DVD-ROM). Components described above are meant only to show various possibilities. In no way should the aforementioned example computer system limit the scope of the present disclosure.

Data conversion controller 175 receives digital transfer data and provides the digital data to an analog output device 192 of a codec 190. Analog output device 192 converts the digital data to an analog data. Codec 190 may be any codec known in the art that is capable of receiving digital data of a defined format and converting it to an analog domain version of the data. As an example, the digital data may be voice over internet protocol (VOIP) data which is converted to an analog signal compatible with a speaker. Based upon the disclosure provided herein, one of ordinary skill in the art will recognize a variety of codecs that may be used depending upon the particular types of digital data to be converted. Analog output device 192 provides the analog domain signal to an analog input device 194. Analog input device 194 converts the received analog domain signal back to the digital domain, and the digital domain data is provided back to data conversion controller 175. In turn, digital conversion controller 175 passes the data on to a recipient.

It is noted that while this embodiment is disclosed as converting from the digital domain to the analog domain and then back to the digital domain to damage any non-real-time data included in the data transfer packet, other approaches may be used. For example, in other embodiments, voice and/or video patterns may be detected in the received digital data, and for portions of a transfer packet where voice or video patterns are not detected, that data is considered problematic and scrambled before the transfer packet is forwarded to a recipient. Thus, for example, patterns seen for data being transferred via a ZOOM™ video/voice call or a ZOOM™ voice only call are known. Where similar patterns are exhibited in a payload of a digital transfer packet being sent via RTP or SIP, the payload is allowed to be transferred on to a recipient. In contrast, where all or a portion of a payload includes data that does not match the expected voice and/or video pattern, that portion is obscured or deleted before being forwarded to a recipient. In this way data that is sent as RTP or SIP data is not allowed to pass where the pattern of the data is not an expected real-time data pattern. In such a case, data conversion controller would perform the entire operation and codec 190 would not be included.

Figure 2:
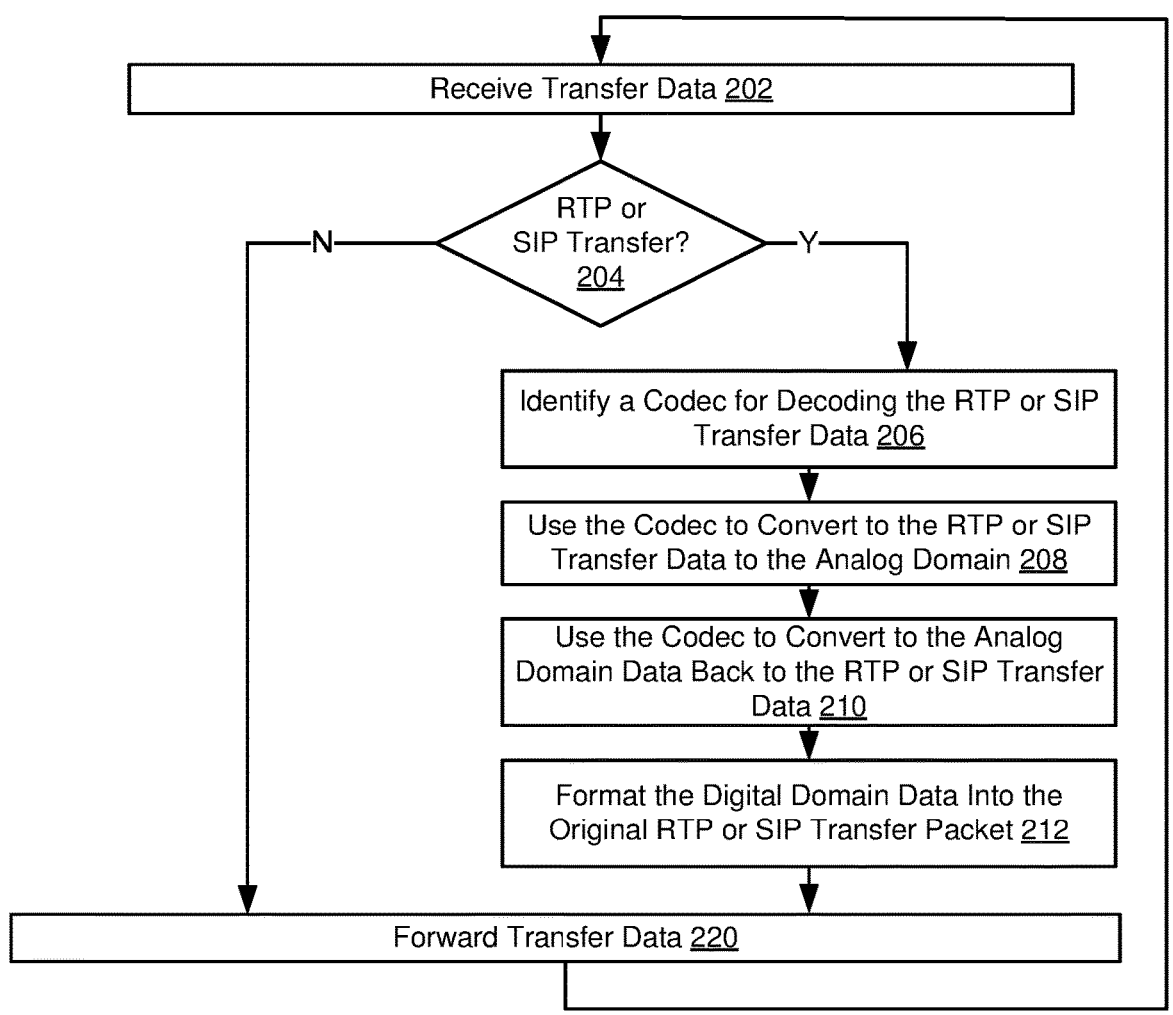
FIG. 2 is a flow diagram shows a codec based method in accordance with various embodiments for reducing the possibility of transferring non-real-time data as RTP or SIP data.

Turning to FIG. 2, a flow diagram 200 shows a method in accordance with various embodiments for reducing the possibility of transferring non-real-time data as RTP or SIP data. Following flow diagram 200, a data transfer request is received (block 202). This data transfer request may be received by a network security appliance from a network element. It is determined whether the data transfer request is for either an RTP or SIP transfer (block 204). This may be done using any approach known the art for identifying the data type being transferred including, but not limited to, querying the header data associated with a data packet for information regarding the type of data or determining which channel the data is being received. Based upon the disclosure provided herein, one of ordinary skill in the art will recognize a number of approaches that may be used in relation to different embodiments. It is noted that while the embodiment is discussed in specific relation to RTP or SIP transfers, it can be applied to detecting any real-time transfers that have non-real-time data embedded therein.

Where it is not an RTP or SIP data transfer (block 204), the data transfer is forwarded without any changes (block 220). This forwarding may be to a recipient identified in the data transfer or to other processing applied by a network security appliance.

Alternatively, where it is an RTP or SIP data transfer (block 204), a codec capable of converting the digital data included in the RTP or SIP data transfer is selected (block 206). This may be done using any approach known in the art for selecting a codec corresponding to the data. The data is then sent to the codec where it is converted from the digital domain to the analog domain (block 208). The same codec is then used to convert the analog domain data back to the digital domain (block 210). This conversion of the digital data through the analog domain results in a resampling of the data using a sampling clock that is not synchronized to any non-real-time data included in the RTP or SIP data transfer. Such asynchronous re-sampling will substantially preserve the original real-time data as the sample rate is consistent with such real-time data, but will damage the non-real-time data as the sampling rate and/or levels will not be related to non-real-time data.

The digital domain data is then formatted into the original RTP or SIP format (block 212). This reformatted RTP or SIP formatted packet is then forwarded (block 220). This forwarding may be to a recipient identified in the data transfer or to other processing applied by a network security appliance.

Figure 3A:
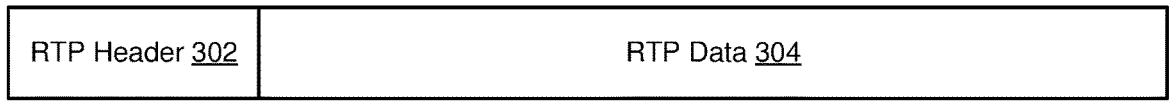
FIGS. 3A-3B graphically depict an input RTP transfer packet including only real-time data, and a corresponding output RTP packet after processing by an RTP and SIP leak protection application in accordance with some embodiments.
Figure 3B:
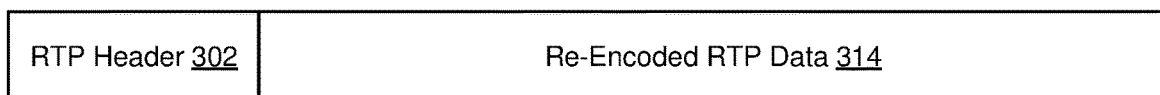

Turning to FIG. 3A, a graphical depiction of a data transfer packet 300 is shown. As shown, data transfer packet 300 includes an RTP header indicating, for example, that the transfer packet is carrying RTP data and a destination of the RTP data. All of the data to be transferred is RTP data 304. Using the method discussed above in FIG. 2, RTP data is provided to a codec where it is converted from the digital domain to the analog domain, and then back to the digital domain. Turning to FIG. 3B, a graphical depiction of a data transfer packet 310 corresponding to data transfer packet 300 is shown. As shown, the header in both data transfer packet 300 and data transfer packet 310 are the same (i.e., RTP header 302). However, RTP data 304 may exhibit some modifications due to the decoding and re-encoding, and thus is identified as re-encoded RTP data 314.

Figure 4A:
FIGS. 4A-4B graphically depict an input SIP transfer packet including only real-time data, and a corresponding output SIP packet after processing by an RTP and SIP leak protection application in accordance with some embodiments.
Figure 4B:
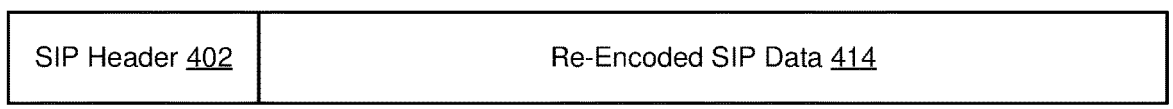

Turning to FIG. 4A, a graphical depiction of a data transfer packet 400 is shown. As shown, data transfer packet 400 includes an SIP header indicating, for example, that the transfer packet is carrying SIP data and a destination of the SIP data. All of the data to be transferred is SIP data 404. Using the method discussed above in FIG. 2, SIP data is provided to a codec where it is converted from the digital domain to the analog domain, and then back to the digital domain. Turning to FIG. 4B, a graphical depiction of a data transfer packet 410 corresponding to data transfer packet 400 is shown. As shown, the header in both data transfer packet 400 and data transfer packet 410 are the same (i.e., SIP header 402). However, SIP data 404 may exhibit some modifications due to the decoding and re-encoding, and thus is identified as re-encoded SIP data 414.

Figure 5A:
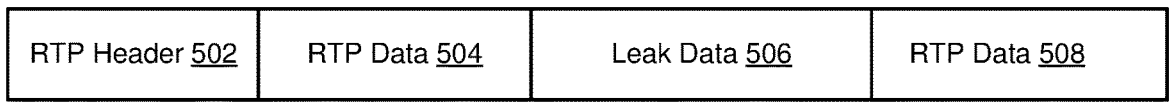
FIGS. 5A-5B graphically depict an input RTP transfer packet including real-time data intermixed with non-real-time data, and a corresponding output RTP packet after processing through a codec in accordance with some embodiments.
Figure 5B:

Turning to FIG. 5A, a graphical depiction of a data transfer packet 500 is shown. As shown, data transfer packet 500 includes an RTP header indicating, for example, that the transfer packet is carrying RTP data and a destination of the RTP data. In this case, the data to be transferred is a combination of RTP data (i.e., RTP data 504 and RTP data 508) and non-real-time data (i.e., leak data 506). Using the method discussed above in FIG. 2, all of the RTP data and leak data is provided to a codec where it is converted from the digital domain to the analog domain, and then back to the digital domain. Turning to FIG. 5B, a graphical depiction of a data transfer packet 510 corresponding to data transfer packet 500 is shown. As shown, the header in both data transfer packet 500 and data transfer packet 510 are the same (i.e., RTP header 502). However, RTP data 504 and RTP data 508 may exhibit some modifications due to the decoding and re-encoding, and thus is identified as re-encoded RTP data 514 and re-encoded RTP data 518, respectively. Leak data 506 will be substantially changed due to the incompatibility of the decoding into the analog domain and re-sampling back to the digital domain as discussed above in relation to FIG. 2. The result is indicated as RTP re-encoded leak data 516.

Figure 6A:
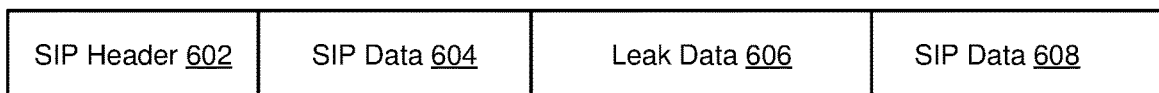
FIGS. 6A-6B graphically depict an input SIP transfer packet including real-time data intermixed with non-real-time data, and a corresponding output SIP packet after processing through a codec in accordance with some embodiments.
Figure 6B:
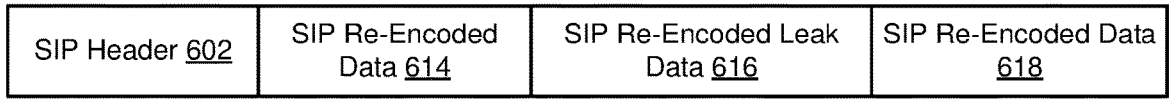

Turning to FIG. 6A, a graphical depiction of a data transfer packet 600 is shown. As shown, data transfer packet 600 includes an SIP header indicating, for example, that the transfer packet is carrying SIP data and a destination of the SIP data. In this case, the data to be transferred is a combination of SIP data (i.e., SIP data 604 and SIP data 608) and non-real-time data (i.e., leak data 606). Using the method discussed above in FIG. 2, all of the SIP data and leak data is provided to a codec where it is converted from the digital domain to the analog domain, and then back to the digital domain. Turning to FIG. 6B, a graphical depiction of a data transfer packet 610 corresponding to data transfer packet 600 is shown. As shown, the header in both data transfer packet 600 and data transfer packet 610 are the same (i.e., SIP header 602). However, SIP data 604 and SIP data 608 may exhibit some modifications due to the decoding and re-encoding, and thus is identified as re-encoded SIP data 614 and re-encoded SIP data 618, respectively. Leak data 606 will be substantially changed due to the incompatibility of the decoding into the analog domain and re-sampling back to the digital domain as discussed above in relation to FIG. 2. The result is indicated as SIP re-encoded leak data 616.

Figure 7:
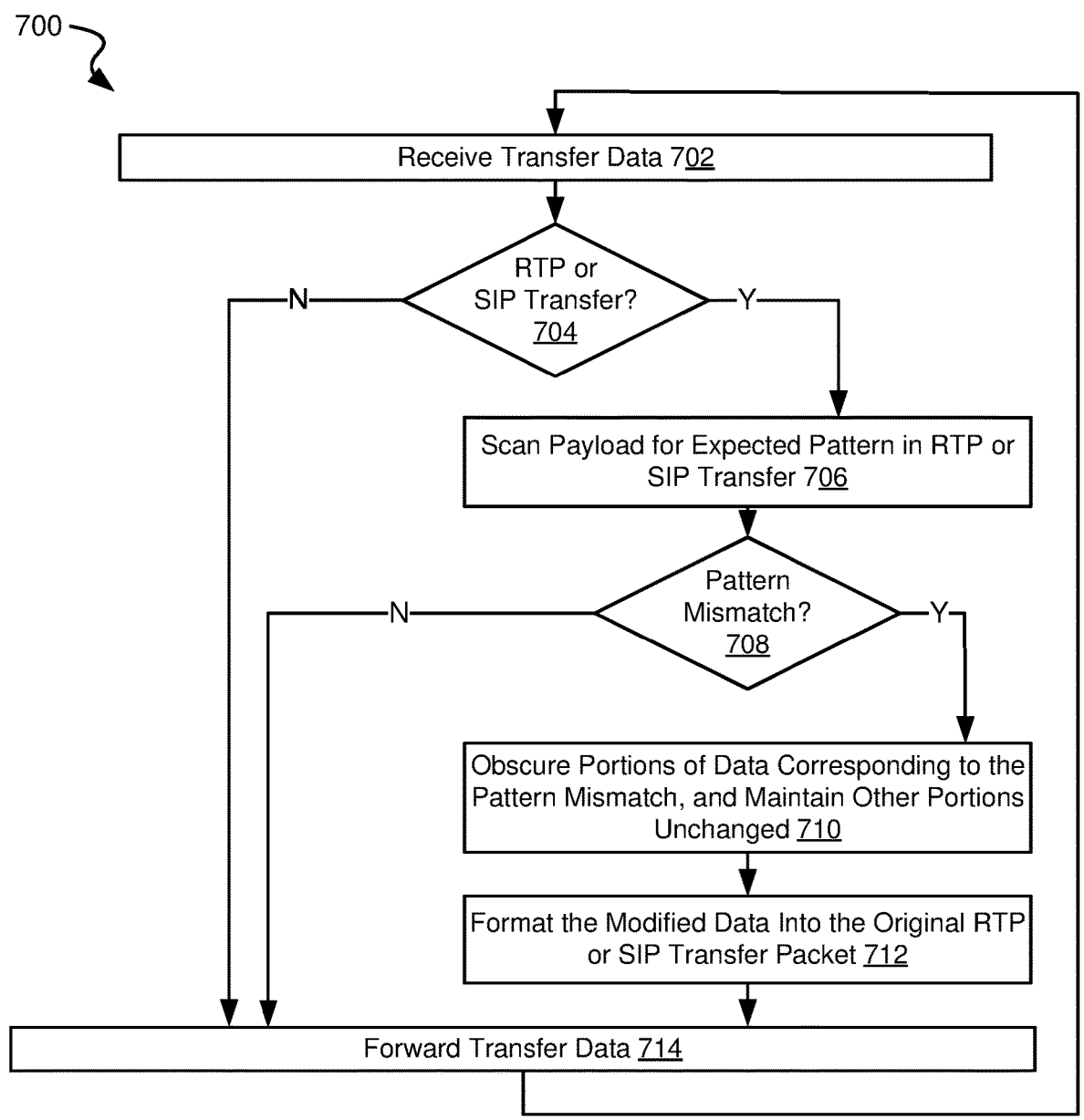
FIG. 7 is a flow diagram shows a pattern recognition based method in accordance with various embodiments for reducing the possibility of transferring non-real-time data as RTP or SIP data.

Turning to FIG. 7, a flow diagram 700 shows a pattern recognition based method in accordance with various embodiments for reducing the possibility of transferring non-real-time data as RTP or SIP data. Following flow diagram 700, a data transfer request is received (block 702). This data transfer request may be received by a network security appliance from a network element. It is determined whether the data transfer request is for either an RTP or SIP transfer (block 704). This may be done using any approach known the art for identifying the data type being transferred including, but not limited to, querying the headed data associated with a data pack for information regarding the type of data or determining which channel the data is being received. Based upon the disclosure provided herein, one of ordinary skill in the art will recognize a number of approaches that may be used in relation to different embodiments. It is noted that while the embodiment is discussed in specific relation to RTP or SIP transfers, it can be applied to detecting any real-time transfers that have non-real-time data embedded therein.

Where it is not an RTP or SIP data transfer (block 704), the data transfer is forwarded without any changes (block 714). This forwarding may be to a recipient identified in the data transfer or to other processing applied by a network security appliance.

Alternatively, where it is an RTP or SIP data transfer (block 704), the data portion (i.e., payload) of the transfer data is scanned to determine whether it is real time data consistent with the indicated RTP or SIP. In some embodiments, a pattern expected for the data type is known and is compared with the received data. Where the pattern is detected in the data it is considered the expected data type. In contrast, where the pattern of a portion of the data does not match what is expected, that portion of the payload is identified as mismatched data. Any pattern detection approach known in the art for discerning a given type of real-time data may be used in relation to different embodiments. As just one example, the pattern detection process used in the Lingua™ V12 speech extractor may be used. Based upon the disclosure provided herein, one of ordinary skill in the art will recognize a variety of real-time data pattern detectors and/or pattern detection algorithms that may be used in relation to different embodiments. Where all of the data is consistent with the expected pattern (block 708), the data transfer is forwarded without any changes (block 714). Again, this forwarding may be to a recipient identified in the data transfer or to other processing applied by a network security appliance.

Where, on the other hand, one or more portions of the payload do not match the pattern for the expected data type (block 708), the portions that mismatch are obscured and the portions that are not mismatched at left unchanged (block 710). In some embodiments, the obscuring includes changing all bits of the mismatched portion to a defined state (e.g., a logic '1' or a logic '0'). In other embodiments, a random pattern of data is used in place of the mismatched portions. Based upon the disclosure provided herein, one of ordinary skill in the art will recognize a variety of approaches for obscuring the data that may be used in relation to different embodiments.

The modified data is then formatted into the original RTP or SIP format (block 712). This reformatted RTP or SIP formatted packet is then forwarded (block 714). This forwarding may be to a recipient identified in the data transfer or to other processing applied by a network security appliance.

Figure 8A:
FIGS. 8A-8B graphically depict an input RTP transfer packet including real-time data intermixed with non-real-time data, and a corresponding output RTP packet after pattern based processing in accordance with some embodiments.
Figure 8B:
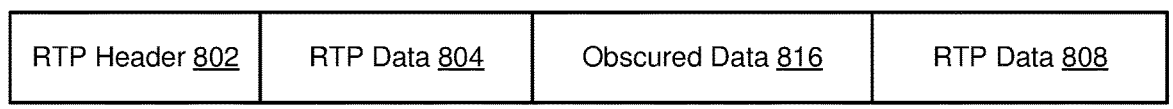

Turning to FIG. 8A, a graphical depiction of a data transfer packet 800 is shown. As shown, data transfer packet 800 includes an RTP header indicating, for example, that the transfer packet is carrying RTP data and a destination of the RTP data. In this case, the data to be transferred is a combination of RTP data (i.e., RTP data 804 and RTP data 808) and non-real-time data (i.e., leak data 806). Using the method discussed above in FIG. 7, all of the RTP data and leak data is scanned to see if it matches patterns for the expected data. In this case, a pattern mismatch will occur for leak data 806. Because of this, leak data 806 will be obscured. Turning to FIG. 8B, a graphical depiction of a data transfer packet 810 corresponding to data transfer packet 800 is shown. As shown, the header in both data transfer packet 800 and data transfer packet 810 are the same (i.e., RTP header 802), and the RTP data in both data transfer packet 800 and data transfer packet 810 are the same (i.e., RTP data 804 and RTP data 808). However, leak data 806 is replaced by obscured data 816.

Figure 9A:
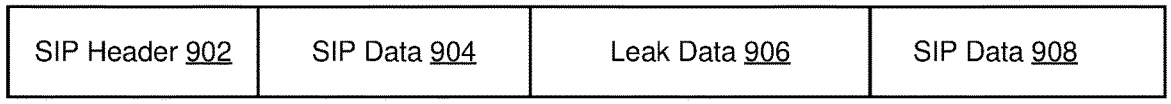
FIGS. 9A-9B graphically depict an input SIP transfer packet including real-time data intermixed with non-real-time data, and a corresponding output SIP packet after pattern based processing in accordance with some embodiments.
Figure 9B:
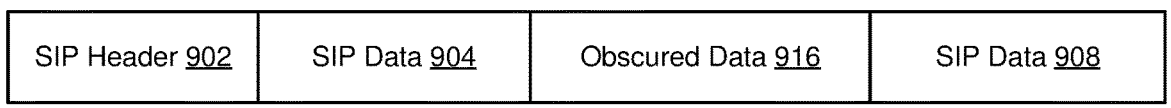

Turning to FIG. 9A, a graphical depiction of a data transfer packet 900 is shown. As shown, data transfer packet 900 includes an SIP header indicating, for example, that the transfer packet is carrying SIP data and a destination of the SIP data. In this case, the data to be transferred is a combination of SIP data (i.e., SIP data 904 and SIP data 908) and non-real-time data (i.e., leak data 906). Using the method discussed above in FIG. 7, all of the SIP data and leak data is scanned to see if it matches patterns for the expected data. In this case, a pattern mismatch will occur for leak data 906. Because of this, leak data 906 will be obscured. Turning to FIG. 9B, a graphical depiction of a data transfer packet 910 corresponding to data transfer packet 900 is shown. As shown, the header in both data transfer packet 900 and data transfer packet 910 are the same (i.e., SIP header 902), and the SIP data in both data transfer packet 900 and data transfer packet 910 are the same (i.e., SIP data 904 and SIP data 908). However, leak data 906 is replaced by obscured data 916.

In conclusion, the present invention provides for novel systems, devices, and methods. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method comprising:
    receiving, by a processing resource, a data transfer packet including a data payload;
    determining, by the processing resource, that the data transfer packet is a real-time data transfer packet;
    based at least in part on the data transfer packet being a real time data transfer packet, providing, by the processing resource, the data payload to a conversion circuit, converting the data payload by the conversion circuit from a digital domain to an analog domain, and then from the analog domain to the digital domain to yield a modified data payload, and receiving, by the processing resource, the modified data payload; and
    forwarding, by the processing resource, the data transfer packet including the modified data payload in place of the data payload.

2. The method of claim 1, wherein the real-time data transfer packet is a real-time transfer protocol packet.

3. The method of claim 1, wherein the real-time data transfer packet is session initiated transfer protocol packet.

4. The method of claim 1, wherein the method further comprises:
    scanning, by the processing resource, the data payload for an expected data type pattern;
    identifying, by the processing resource, a portion of the data payload as not matching the expected data type pattern; and
    obscuring, by the processing resource, the identified portion of the data payload to yield and obscure data set; and
    wherein the modified data payload includes the obscure data set in place of the identified portion of the data payload.

5. The method of claim 4, wherein obscuring the identified portion includes replacing the identified portion with a random pattern.

6. The method of claim 4, wherein obscuring the identified portion includes replacing the identified portion with a fixed pattern.

7. The method of claim 1, wherein the conversion of the data payload is done using a process that is compatible with at least a portion of the data payload.

8. The method of claim 7, wherein the portion of the data payload is a first portion of the data payload, and wherein the process is incompatible with a second portion of the data payload.

9. A system for reducing the possibility of data theft via a real-time transfer, the system comprising:
a processing resource;
a non-transitory computer-readable medium, coupled to the processing resource, having stored therein instructions that when executed by the processing resource cause the processing resource to:
receive a data transfer packet including a data payload;
determine that the data transfer packet is a real-time data transfer packet;
based at least in part on the data transfer packet being a real time data transfer packet, provide the data payload to a conversion circuit, wherein the conversion circuit is to convert the data payload from a digital domain to an analog domain, and then from the analog domain to the digital domain to yield a modified data payload, and receive the modified data payload from the conversion circuit; and
forward the data transfer packet including the modified data payload in place of the data payload.

10. The system of claim 9, wherein the instructions that when executed by the processing resource cause the processing resource to:
real-time data transfer packet is a real-time transfer protocol packet.

11. The system of claim 9, wherein the real-time data transfer packet is session initiated transfer protocol packet.

12. The system of claim 9, wherein the computer-readable medium further has instructions stored therein that when executed by the processing resource cause the processing resource to:
scan the data payload for an expected data type pattern;
identify a portion of the data payload as not matching the expected data type pattern; and
obscure the identified portion of the data payload to yield and obscure data set; and
wherein the modified data payload includes the obscure data set in place of the identified portion of the data payload.

13. The system of claim 12, wherein obscuring the identified portion includes replacing the identified portion with a random pattern.

14. The method of claim 12, wherein obscuring the identified portion includes replacing the identified portion with a fixed pattern.

15. The system of claim 9, wherein the conversion of the data payload is done using a process that is compatible with at least a portion of the data payload.

16. The system of claim 15, wherein the portion of the data payload is a first portion of the data payload, and wherein the process is incompatible with a second portion of the data payload.

17. A non-transitory computer-readable storage medium embodying a set of instructions, which when executed by a processing resource, causes the processing resource to:
receive a data transfer packet including a data payload;
determine that the data transfer packet is a real-time data transfer packet;
based at least in part on the data transfer packet being a real time data transfer packet, provide the data payload to a conversion circuit, wherein the conversion circuit is to convert the data payload from a digital domain to an analog domain, and then from the analog domain to the digital domain to yield a modified data payload, and receive the modified data payload from the conversion circuit; and
forward the data transfer packet including the modified data payload in place of the data payload.

18. The non-transitory computer-readable storage medium of claim 17, wherein the non-transitory computer-readable storage medium further has instructions stored therein that when executed by the processing resource cause the processing resource to:
scan the data payload for an expected data type pattern;
identify a portion of the data payload as not matching the expected data type pattern; and
obscure the identified portion of the data payload to yield and obscure data set; and
wherein the modified data payload includes the obscure data set in place of the identified portion of the data payload.

* * * * *